March 28, 1967 R. G. HAMILTON ET AL 3,310,900
RETROREFLECTIVE SIGN
Filed Oct. 4, 1963 2 Sheets-Sheet 1
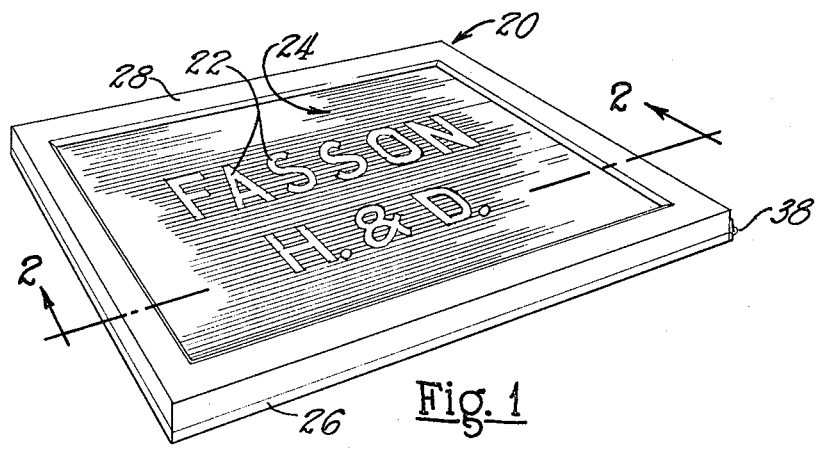
Fig. 1
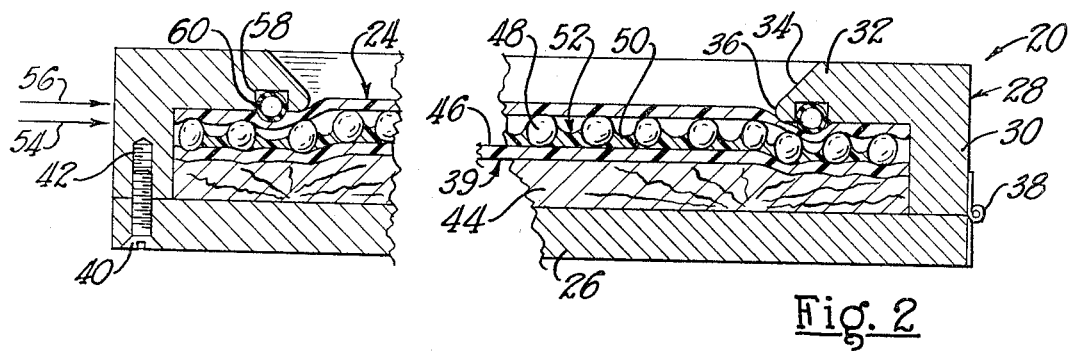
Fig. 2
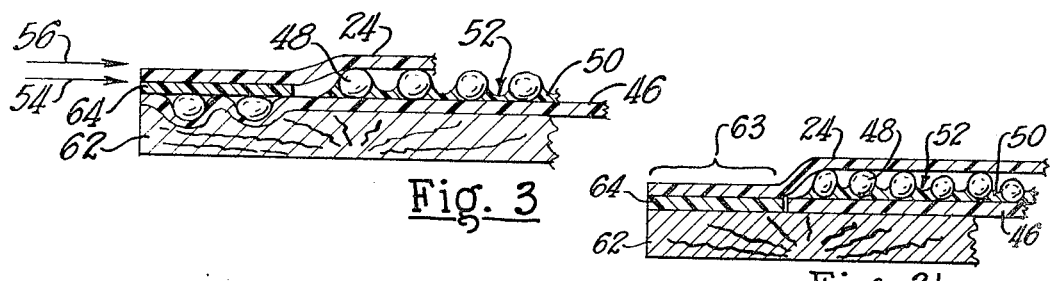
Fig. 3
Fig. 3b
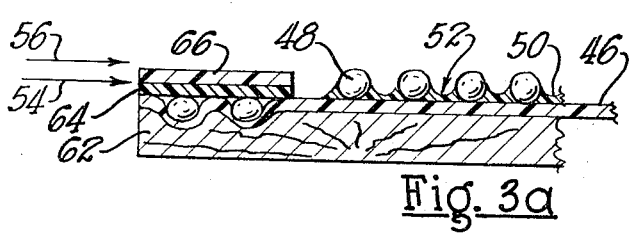
Fig. 3a
INVENTORS
ROBERT G. HAMILTON &
BY LESTER R. DICKARD
ELY, PEARNE & GORDON
ATTORNEYS March 28, 1967 R. G. HAMILTON ET AL 3,310,900
RETROREFLECTIVE SIGN
Filed Oct. 4, 1963 2 Sheets-Sheet 2

INVENTORS
ROBERT G. HAMILTON &
BY LESTER R. DICKARD
ELY, PEARNE & GORDON
ATTORNEYS

United States Patent Office 3,310,900
Patented Mar. 28, 1967

3,310,900
RETROREFLECTIVE SIGN
Robert G. Hamilton, Mentor, and Lester R. Dickard, Painesville, Ohio, assignors to Avery Products Corporation, a corporation of California
Filed Oct. 4, 1963, Ser. No. 313,914
1 Claim. (Cl. 40—135)

This invention relates to reflective sign systems; and, more particularly, to retroreflective sign systems, comprising a retroreflective element and a transparent, reversely printed cover film bound together into a unitized system having unique features of weather-resistance and anti-dulling by soil or water; changeability in a unique and economical manner; weatherproofness; and capability of application to a variety of surfaces and environments.

Retroreflective sign systems of the prior art have achieved a substantial importance in the advertising industry. These are characterized by a support having a reflective surface attached thereto and to which surface there is attached, as by suitable adhesive, a retroreflective material, such as spheres or beads of glass or the like. Incident light striking the beads of glass is reflected by the beads in combination with the reflective base and is returned in a direction substantially parallel to the incoming direction. The result is that a very slight amount of light at night, as produced by the headlights of an automobile, can make such a sign appear to be illuminated, and thus an advertiser is able to do a substantial amount of advertising without the expense of electric power to place light on the sign for constant illumination purposes.

One of the principal disadvantages of these retroreflective systems of the prior art has been that the glass beads were directly exposed to the atmosphere. This collected dirt and ruined the reflective efficiency; further, a layer of moisture, such as rain, on the beads will effectively kill the reflective power, particularly when the light strikes the surface from other than a truly transverse direction. Even when the beads were coated, the rough surface would be badly dulled by moisture. These considerations led to efforts to provide practical systems having smooth front faces. In one successful embodiment, the beads were encapsulated in a transparent face film having a smooth face surface. This overcame the dulling problem but still required the manufacture of an entirely new system for each new message.

In a more recent development of this art, efforts were made to fasten a protective flexible film over the glass bead retroreflective material to provide the smooth face. The film was mounted in such a way as to maintain an air layer between the cover film and at least the majority of the beads, since this was said to be desirable from the optical standpoint. This latter development utilized spacing supports either in the form of a grid or a small percentage of larger beads to which the cover film was attached in a grid work pattern to preserve the air layer. It will be understood that with the cover layer secured either partially or in whole to a bridge work over the retroreflective beads, the sign is permanent and cannot be changed. Further, if contaminants get between the retroreflective material and the cover film, the effectiveness of the beads will be ruined.

Accordingly, a substantial advance in the art would be provided by a unique retroreflective sign system characterized by a protective cover film supported upon but not secured to the retroreflective material; capable of having different advertising indicia secured thereto in a replacement type system; further characterized by substantial economy of manufacture; and still further characterized by ease of fabrication.

Important objects of this invention, therefore, are to provide improved retroreflective sign systems having some or all of the foregoing characteristics.

Other objects of this invention will appear in the following description and appended claims, reference being had to the accompanying drawings forming a part of this specification wherein like reference characters designate corresponding parts in the several views.

FIGURE 1 is a perspective view of a sign system made according to the invention;

FIGURE 2 is an enlarged, sectional view taken along the line 2—2 of FIGURE 1;

FIGURE 3 is an enlarged, fragmentary, sectional view of a sign system employing the principles of invention and utilizing a double-faced, pressure-sensitive tape or adhesive layer for anchoring the reflective backing to the cover layer;

FIGURE 3a is an enlarged, fragmentary, sectional view of the fabricated reflective material used in the product shown in FIGURE 3;

FIGURE 3b is an enlarged, fragmentary, sectional view of the nature of FIGURE 3, illustrating edge joinder to a marginal unbeaded portion of a support for a reflective backing material;

Figure 4:
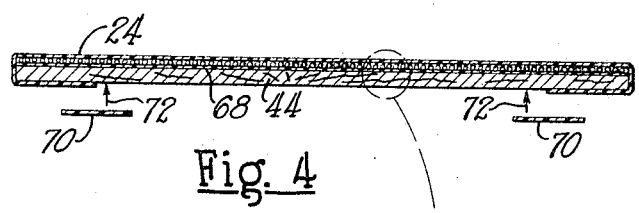
FIGURE 4 is a sectional view of a product of invention, wherein the cover film is secured at its edges to the back of the reflective material.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminolgy employed herein is for the purpose of description and not of limitation.

The frame embodiment

A principal application of the invention is that of changeable signs at minimum cost and maximum ease of formation, such as used in public transportation. These take the form of placards placed along the upper part of bus walls and attached panels on the backs of taxicabs, the outsides of buses, and others. Where the units are used in traffic, they can be made particularly attractive for both day and night observation and eye catching appeal by virtue of the fact that they incorporate a layer of retroreflective glass beads in combination with a transparent color overlay to pick up car headlights and reflect the light therefrom back to the driver of such vehicles. These products are well known for traffic stop signs and others, and are becoming increasing popular for display purposes.

It is a particular advantage of the present invention that not only are the products resistant against deterioration by weather, but they are also resistant against the reflectivity of the bead layer being destroyed by water or other foreign materials. Further, it is an advantage of the system of the present invention that the printed indicia carried as a component part of the system can be readily replaced, being reverse printed on a detachable cover film, overlying the beads and protecting them from the elements, as well as protecting the indicia itself from deterioration.

In accordance with this embodiment of the invention, as best shown in FIGURES 1 and 2, a frame of particular design and employing a weather seal, is utilized as a component of the system, the remaining components of the system being a reflective layer and the previously mentioned, reversely printed cover film held together in a specific relationship.

As shown in FIGURES 1 and 2, the frame 20 of annular configuration entirely surrounds the unit. The sign legend carried by the sign is indicated by the reference numeral 22. It is to be understood that this is reversely printed on the under face of the transparent cover film 24 in colored, transparent ink.

Referring now to more particular details of this aspect of the invention, we note in FIGURE 2 that the frame 20 includes a back plate 26 and an overlying annular frame member 28.

This annular frame member 28 is in effect an L-shaped section, as in a picture frame molding. Thus, there is an upstanding wall portion 30 joined with an overlying lip portion 32. The inner periphery of the overlying lip portion 32 is characterized by a bevel 34, terminating in a very short, transverse wall portion 36. This is designed to have at least a small dimension, that is, other than a razor edge, and preferably radiused as indicated so as to have no sharp corners that might tend to tear, cut or deteriorate the adjacent cover film 24, as during handling or otherwise.

As shown at the right hand side of FIGURE 2, a hinge 38, suitably of the continuous or intermediate types, permits the annular member 28 to be pivoted relative to the back plate 26 to permit replacement of the cover film 24 or the reflecting member here designated 39.

As shown at the left side of FIGURE 2, a plurality of screws 40 are passed through apertures in the back plate 26 and into threaded apertures 42 in annular frame member 28. This means of fastening is merely exemplary and not to be considered limiting on the total scope of invention.

*The reflective base layer in detail*

In the prior discussion, the reflective base layer has been designated generally by the reference numeral 39. The various elements comprised in this component include a backing member or base 44 suitably fabricated of a water-resistant fiberboard such as cardboard or similar paper backing of economical manufacture, or equivalent. Of course, more expensive materials such as metal sheets can be utilized, if desired. Over the backing member 44 there is placed a thin, reflective layer 46, such as white paint, aluminum foil, or the like. Upon the reflective layer 46 there is positioned, as by a suitable joggling or distribution method, a layer of glass beads 48. These are retained in place by a bonding matrix 50. The glass layer is built up by first applying the bonding matrix, suitably a transparent resin, or varnish, keeping the layer 50 thickness less than the diameter of the beads. The beads are then dropped in place and the backing vibrated or jogged to smooth out the glass layer and cause the beads to penetrate the bonding matrix 50, the matrix flowing upon the beads in the menisci indicated at 52. It will be noted that the tops of the beads 48, extended above the menisci 52 and, therefore, if unprotected, form in effect a porous surface somewhat like the skin of the hand, with many dirt catching crevices around the beads. As pointed out above, if these are not protected in a manner to retain an air layer over the bead layer, a film of water will kill the night reflectivity of the beads. Also, the pores or spacings between the beads will become filled with dirt on exposure to the atmosphere, and the effectiveness also blotted out.

*The cover film and its retention*

An important advance provided by the present invention is the unique manner in which the cover film 24 is retained in place in protective position, riding and supported in unattached relationship upon the tops of the beads 48, and having a weather seal around its edges. Such a seal may be built into the frame 20.

As will be noted, when the frame 20 is closed down on the two inside components or retained components, comprising the reflective element 39 and the cover film 24, the beads 48 around the periphery are pressed downwardly slightly into the base member 44, to an elevation lower than the tops of the remainder of the beads. The new level of these beads is indicated by the arrow 54, designating a plane at the secondary bead level developed by the compression as distinguished from the plane 56 representing the original height of the highest beads. The effective bond, therefore, between the cover film 24 and the reflective backing system 39 is at an elevation lower than the height of the highest of the beads which function to retroreflect light of an indicia pattern. This is illustrated by the fact that the arrow 54 plane is lower than the original plane 56. Although the beads 48 are shown at a uniform height, it will be understood that normally there is a variation in departures of individual beads from nominal size of several to a dozen or more percentage points. Accordingly, only a minority of the beads 48 will be the highest beads of the indicia pattern, and these highest beads will be distributed and dispersed throughout the area of the indicia pattern.

*The weather seal*

Referring to FIGURE 2, note that the overlying lip portion 32 of the annular frame member 28 has a continuous groove 58 on the under surface thereof, to receive a sealing member or tube 60. When the annular member 28 carrying the sealing member 60 is compressed down upon the overlying cover film 24, to press the perimeter beads down in the manner indicated, the sealing member will provide a fluidproof weather seal adjacent the periphery of the effective area of the sign. Fastening with the screws 40 assures that the weather seal is retained in an effective manner.

*The adhesive seal embodiment of FIGURES 3 and 3a*

Instead of the embodiment of FIGURES 1 and 2, the present invention is adapted to manufacture in a version as shown in FIGURES 3 and 3a. There, the backing is designated by the reference numeral 62 and this may be of the cardboard or paperboard type illustrated for the previous embodiment or a heavier and relatively stiff fiberboard of the nature of compressed board, impregnated with a suitable material to resist exposure to the atmosphere, including rain, snow, and the like. It is to be understood, however, that within the scope of the invention, this may be a flexible member with a pressure-sensitive adhesive on the back so that it can be attached to a billboard, signboard, or other suitable, flat or slightly convex support surface. The backing 62 supports a reflective layer 46. The layer 46 may comprise one or more strata, including transparent spacing strata, if desired. These are not shown. A layer of beads 48 is retained in position on the layer 46 by means of a bonding matrix 50, the menisci 52 being present as discussed for the prior embodiment between the beads.

In this embodiment of the invention, a layer of pressure-sensitive or heat-sealing or other adhesive 64 is provided in the form of a narrow band around the periphery of the reflective layer 46 for attaching the cover film 24, instead of using the frame 20 of the prior embodiment. The layer 64 may, instead, be a double-coated adhesive tape, or equivalent.

It should be pointed out that the layer 64 of adhesive may be applied by a roll coater or otherwise in such a way as to generally depress the beads 48 from the original level 56 down to the level 54, as in the prior embodiment. Thus, the bonding plane represented by the arrow line 54 is at an elevation lower than the height of the highest beads, forming the operating or effective light reflecting area of the sign, such height being represented by the arrow line 56.

Relative to this aspect of the invention, it is to be understood that if desired a pattern of depressed areas can first be embossed into the reflective component and thereafter an adhesive sprayed or roll-coated into the patterned areas so that the depression of the beads can be effected and then the adhesive subsequently applied, the two steps being performed in consecutive order.

*The raw material for the FIGURE 3 embodiment*

This, as shown in FIGURE 3a, comprises backing 62 with the reflective layer 46 thereon and a layer of glass beads 48 overlying the layer 46. The beads 48 are held in place by the bonding matrix 50. Along the edge, there is the band or layer of releasable adhesive 64 or double-coated adhesive tape or the like. Note that the edge beads have been very slightly depressed so that the tops of these beads extend about to the bottom of the adhesive 64. A strippable cover film 66 overlies the layer 64 (or the entire face, if desired) for protection. This is removed at later fabrication so that the ultimate user can apply a cover film having a desired indicia message reverse-printed thereon, preferably of transparent colored ink for contrasting color night viewing, thus providing for a change of the cover film and indicia, inasmuch as the adhesive is good for repeated use.

Alternatively, the patterned areas on which the layers 64 of adhesive or double-coated tape are applied can be formed dry. Then, adhesive or tape can be applied to the cover film in a matching pattern and, thus, in a replacement situation, a new and more "live" adhesive will be available for bonding of the film and the reflective component together.

It should be pointed out that a favorable factor in having the sealing plane or plane of attachment at a level lower than the height of the highest beads in the operating bead section is the accomplishment of a stretching, or at least a tensioning action, of the film across the beads as the pressure-sensitive adhesive pattern is brought into intimate contacting relationship with the depressed pattern formed in the bead layer.

At this point, it should be mentioned that a supplemental or alternative treatment can be used to tighten the cover film after it is in place. Shrink films, and preferably biaxially oriented films, may be employed. A very satisfactory tightening of the cover film in a uniform manner can be effected by subjecting the film to a shrinking agent, such as heat, after the film is in place. Actually, in a rather warm climate where the cover film will be exposed to intense sunshine, this in itself will be effective to tighten heat shrinking films automatically while the system of invention is in use. In colder climates, if the shrinking agent is heat, the tightening can be effected by directing heat rays from an infrared lamp against the finished system to effect the tightening.

*The unbeaded edge embodiment of FIGURE 3b*

As shown in FIGURE 3b, the backing support 62 can extend beyond the marginal edges of the beaded reflector system 46, 48, 50, and 52 to provide an unbeaded marginal edge area 63. To this unbeaded edge area 63, there is suitably applied a band 64 of adhesive, double-faced tape or the like. This provides joinder and seal against entry of atmospheric constituents around an effective reflecting area in accordance with the concept of the invention wherein the cover film 24 is bonded to the backing at an elevation lower than the tops of the functional beaded surface, retaining the film in a supported but unattached relationship over the tops of the beads.

Note that the bond of the cover film 24 is at an elevational level lower than the tops of the beads. This could be effected as well by using the frame 20 of FIGURE 1.

*The embodiment of FIGURE 4*

Figure 4A:
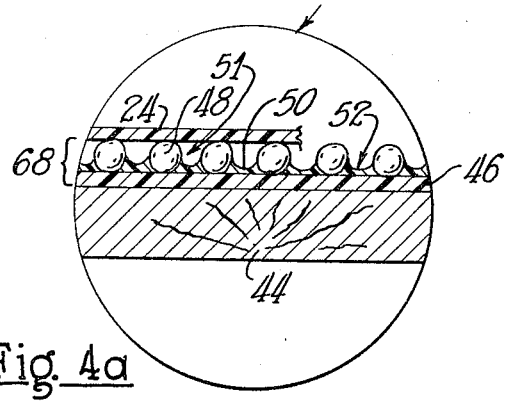
FIGURE 4a is a greatly enlarged portion of FIGURE 4.

As shown in FIGURE 4, a reflective component designated by the reference numeral 68 is utilized. The greatly enlarged, fragmentary, sectional view of FIGURE 4a shows this component to comprise a backing member or base 44, reflective layer 46, beads 48, and a bonding matrix 50. It is to be noted that the beads are illustrated as all sitting uniformly on top of the reflective layer 46, and that such illustration, therefore, shows an idealized uniformity of bead sizing which presently may not be economically feasible, but which may become so in the future.

The cover film 24 overlaps the edges of the reflective component 68, and is doubled back on the underneath side. Adhesive tapes or pressure clamps, schematically indicated by the reference number 70, are then applied, as indicated by the arrow 72, to retain the cover film 24 in its wrapped position. In any case, this joint should be weathertight.

As mentioned above, an optional heating step can be utilized to stretch the cover film 24 taut over the upper surface of the reflective component 68 in the event a biaxially oriented or other shrinkable film is desired.

In accordance with this and the prior embodiments of the invention, it is to be understood that the cover film has an advertising message reversely printed on its underneath side so as to be protected from the weather and elements. In a preferred aspect of the invention, this is done in a transparent colored ink so that during both day and night viewing, the sign will have an attractive appearance.

From the foregoing, it will be evident that the cover film carries the advertising medium as distinguished from the more expensive reflective component, and, thus, the reflective component is preserved for repeated use while the cheaper component, the cover film, is merely discarded and replaced when it is desired to change the advertising message.

In current retroflective systems, which have sign legends directly imprinted upon the glass bead layer, complete removal and replacement of the entire reflective portion are required when changing messages. In contrast, the present system merely requires removal of the cover film to apply a new message.

*Illustration of differing bead sizes*

Figure 4B:
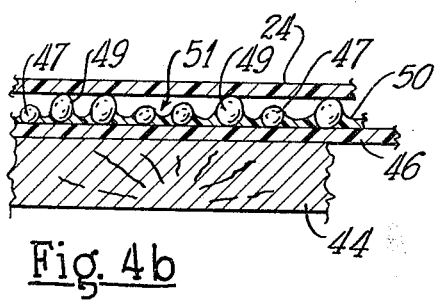
FIGURE 4b is an enlarged, fragmentary, sectional view illustrating differences in bead sizes within a grade to provide plural elevated support points higher than the remainder of the beads, randomly distributed over the area of the reflective material.

The greatly enlarged, fragmentary, sectional view of FIGURE 4b may be regarded as a more economically realistic detail illustration of the FIGURE 4 embodiment, and is included in the present description to again show that the beads used in producing refracting, reflecting layers in accordance with this art are not generally all of exactly the same size. It may again be noted that the assortment of sizes may (1) provide relatively high support points distributed randomly over the area of the reflective material, for supporting the cover film 24, and (2) provide a slight spacing between the bottom face of the cover film 24 and the tops of the beads 47 of lesser diameter than the larger support beads 49. In a practical application, diameters of the beads vary from about 0.0024 inch to about 0.0035 inch.

*Extended scope of invention*

Having now carefully reviewed several aspects of the invention, it should be pointed out that there are ramifications which are worthy of mention.

The film is preferably colorless with an underprint of transparent colored ink in a particular pattern, preferably remaining unprinted in the areas which it is designed to have the backing show through for night viewing. As has been mentioned above, the transparent colored ink provides both daylight and night attractiveness, forming a mask through which the bright reflective coating can show.

This invention is not necessarily related to a certain constitution of the reflective layer. However, it might be pointed out that true glass beads are, of course, to be included within the scope of the invention. However, the term "glass" is to be used herein to embrace transparent solid materials including quartz. The so-called organic glasses may also be used, such as the methacrylate resins. Inorganic glasses will generally be preferred because of their low cost, stability, weatherproofness, and hardness, but others may be used where suitable.

A substantial variation can be tolerated relative to the adhesive, the pressure-sensitive materials, of course, being highly desirable and best fitted to in situ sign form use in accordance with the principles of this invention. In this respect, though, it should be pointed out that the heat or solvent activated materials, as well as the pressure-sensitive materials, are to be included within the scope of the invention. Of course, double-faced tapes including a carrier with adhesive on both sides and the like are also to be included within the scope of the invention.

The adhesive pattern coating may be achieved through silk screening, spray or roller coating or any of the other common methods of applying adhesives. Also, the adhesives may be applied to individual pre-cut pieces of reflective sheeting and color overlays, or it may be applied in a pattern to fit a sheet containing multiple signs or emblems and, after lamination, die cut into individual pieces sealed around the edges.

It is to be understood that the broad precept of the present invention encompasses an unattached but smooth protective cover layer in substantial contact with the tops of the beads of the reflective backing, an important advantage being the fact that the assembly is edge-sealed to prevent weather or contamination from entering between the film and reflective bead layer.

A particular advantage flowing from the invention is the fact that the cover film and the message to be transmitted to the viewing eye can be readily changed without imparting a substantial cost to the operation, and preserving the more expensive glass bead-containing reflective backing.

In passing, it should be noted that the smooth surface of the cover film offers little opportunity for the accumulation of highway dust or mud which is bound to be sprayed or splashed against highway signs in use. Further, that which is accidentally accumulated is more easily washed off by periodic rain. Moreover, this advantage of cleaner signs and markings is obtained with little loss of efficiency of the sign or marker in reflecting back incident light to the source. Further, rain will have little diminishing effect upon the night efficiency of this product.

As a further extension of the invention, it is to be considered that the edge joinder and sealing of cover film to the reflective backing can be performed on unembossed sheets, the pressure of application being effective to very slightly depress the beads at the bond area and seal against contaminant entry.

Furthermore, the desired depression of the areas of joinder can be accomplished simply by supporting the entire assembly on a slightly convex mounting base, thereby automatically assuring that the peripheral areas or lines of joinder or sealing are lowermost and that the face film is supported snugly against the highest beads throughout the reflective bead face.

The invention is not restricted to the slavish imitation of each and every one of the details and features described above, which have been set forth merely by way of example with the intent of most fully setting forth the teaching of the invention. Obviously, devices may be provided which change, eliminate or add certain features of orientation or configuration, or which make other structural modifications, all without departing from the invention.

What is claimed is:

In a retroreflective sign system,
a support having a light-reflective layer and a layer of light-refracting beads attached to said reflective layer,
a transparent cover film overlying said beads,
a base member behind said support,
an endless peripheral frame member overlying said support and cover film,
means holding said frame and base members together and applied with sufficient force to simultaneously anchor said support cover film together, seal said support and cover film against entry of ambient atmospheric constituents, and press the beads around the periphery of the support to a level below the original level of the tops of the beads,
and said film thereby being retained in supported but unattached relationship across the remaining bounded area of the reflective layer.

References Cited by the Examiner

UNITED STATES PATENTS

| | | | |
|---|---|---|---|
| 976,576 | 11/1910 | Kasanof | 40—135 |
| 1,529,776 | 3/1925 | Dennewith | 40—135 |
| 1,670,327 | 5/1928 | Tohener | 40—135 |
| 1,937,339 | 11/1933 | George | 40—135 |
| 2,073,844 | 3/1937 | Lowenfels | 40—135 |
| 2,128,105 | 8/1938 | Tighe | 161—5 |
| 2,181,044 | 11/1939 | Brown | 40—135 |
| 2,326,634 | 8/1943 | Gebhard | 40—135 X |
| 2,377,508 | 6/1945 | Michaels | 40—136 X |
| 2,432,928 | 12/1947 | Palmquist | 40—135 |
| 2,499,452 | 3/1950 | Bonnet | 40—135 X |
| 2,500,511 | 3/1950 | Bonnet | 40—135 X |
| 2,620,289 | 12/1952 | Douglas | 40—136 X |
| 2,948,191 | 8/1960 | Hodgson | 40—135 X |
| 3,065,559 | 3/1962 | McKenzie | 40—135 X |
| 3,176,420 | 4/1965 | Alverson | 40—135 |
| 3,190,178 | 6/1965 | McKenzie | 40—136 X |

LAWRENCE CHARLES, *Primary Examiner.*

EUGENE R. CAPOZIO, JEROME SCHNALL,
*Examiners.*

H. F. ROSS, *Assistant Examiner.*